United States Patent

Noonan et al.

[11] Patent Number: 5,881,821
[45] Date of Patent: Mar. 16, 1999

[54] FIN SWEEP ASSEMBLY AND METHOD OF MANUFACTURE

[75] Inventors: James Thomas Noonan, Johnston; Terry Lee Lowe, Ankeny, both of Iowa

[73] Assignee: Deere & Company, Moline, Ill.

[21] Appl. No.: 772,035

[22] Filed: Dec. 19, 1996

[51] Int. Cl.⁶ .................................................. A01B 15/00
[52] U.S. Cl. .......................... 172/762; 172/730; 172/745; 172/732; 403/272; 29/891; 228/174
[58] Field of Search .................................... 172/726, 728, 172/730, 732, 733, 745, 762; 403/270, 271, 272; 29/891, 14; 228/135, 171, 174

[56] References Cited

U.S. PATENT DOCUMENTS

| | | | |
|---|---|---|---|
| 83,030 | 10/1868 | Berdan | 172/733 |
| 1,636,936 | 7/1927 | Griggs | 172/733 |
| 2,020,841 | 11/1935 | Lier | 172/745 |
| 2,051,328 | 8/1936 | Christensen | 172/745 |
| 2,148,925 | 2/1939 | Bochy | 29/402.16 X |
| 2,467,311 | 4/1949 | Hudson | 29/14 X |
| 3,104,724 | 9/1963 | Pollock | 172/733 |
| 3,425,117 | 2/1969 | Hill | 29/891 X |
| 3,762,012 | 10/1973 | Aker | 29/159 R |
| 4,078,866 | 3/1978 | Hawkins | 172/762 X |
| 4,190,115 | 2/1980 | Couture | 172/762 X |
| 4,408,667 | 10/1983 | Jarvis | 172/745 X |
| 4,779,686 | 10/1988 | Ryan | 172/762 X |
| 4,825,782 | 5/1989 | Mikkelsen | 172/745 X |
| 5,284,289 | 2/1994 | Killian | 403/272 X |
| 5,343,959 | 9/1994 | Frisbee et al. | 29/891 X |
| 5,531,276 | 7/1996 | Noonan et al. | 172/662 |

FOREIGN PATENT DOCUMENTS

| | | | |
|---|---|---|---|
| 565121 | 10/1958 | Canada | 172/745 |
| 2626433 | 8/1989 | France | 172/745 |

OTHER PUBLICATIONS

Welding Handbook, Eighth Edition, American Welding Society, p. 142, Feb. 1992.
Welding Skills, American Technical Publishers, Inc., pp. 39, 40, 395, 396, Dec. 1985.
Manufacturing Processes, Roberts and Lapidge, pp. 264, 265, 266, 280, Dec. 1977.

*Primary Examiner*—Victor Batson

[57] ABSTRACT

A tillage sweep assembly includes a base sweep with a central fore-and-aft slot. A support strap or stem includes a corresponding fore-and-aft extending protrusion which mates with the slot. A filet weld connects the top of the base sweep to the support strap with the weld extending around the strap. A plug weld is added to the underside of the sweep in an offset or lifted portion of the bottom of the base sweep above the cutting plane of the sweep. The extra plug weld adds strength to the existing filet weld joint and significantly reduces the chance of inadvertent base sweep loss. The location of the plug weld above the cutting plane protects the plug weld from wear. The strap or step of the sweep assembly is slotted for ease of pitch adjustment, and the base sweep has wings with substantial fore-and-aft extending end portions to retain working width over the life of the sweep.

11 Claims, 2 Drawing Sheets

FIN SWEEP ASSEMBLY AND METHOD OF MANUFACTURE

BACKGROUND OF THE INVENTION

1) Field of the Invention

The present invention relates generally to agricultural tillage implements and more specifically to a sweep generally of the type commonly referred to as a Smith Fin sweep.

2) Related Art

A sweep such as the Smith Fin sweep has been used for years in crops such as peanuts where minimal soil throw is desired. The sweep assembly includes a flat, horizontal base sweep member with straight leading edges diverging in the rearward direction from a central point. The top of the base sweep has a central portion welded to a flat, upright strap which is supported from a shank. One of the main drawbacks of such a sweep assembly is that the base sweep can break away from the strap in the area of the weld, resulting in added expense, down time and lost productivity. Often, the separated base sweep ends up in a tractor or implement tire, causing damage or destruction to the tire and consternation to the operator. Another disadvantage of the sweeps has been a change in width of the sweep with wear which reduces the total cultivated band. Also pitch angle adjustment is sometimes difficult and the proper working angle cannot be easily provided with some shank geometries.

BRIEF SUMMARY OF THE INVENTION

It is therefore an object of the present invention to provide an improved sweep assembly. It is a further object to provide such a sweep assembly which overcomes most or all of the aforementioned problems.

It is a further object of the invention to provide an improved sweep assembly of the Smith Fin type. It is another object to provide such an assembly which is less prone to breakage than at least most previously available Smith Fin sweep assemblies. It is a further object to provide such a sweep assembly which retains the desired working width over the life of the sweep and wherein pitch adjustments are easily made to accommodate different shank geometries.

It is a further object of the invention to provide an improved method for fabricating an agricultural sweep assembly. It is yet another object to provide such a method which reduces the incidences of the base sweep breaking away from the support strap.

It is a still another object of the invention to provide a sweep assembly with an improved connection between the support strap and the base sweep.

A tillage sweep assembly constructed in accordance with the above objects includes a base sweep with a central fore-and-aft slot. A support strap or stem includes a corresponding fore-and-aft extending protrusion which mates with the slot. The top of the base sweep is welded to the support strap with the weld extending around the strap adjacent the slot to form a filet weld joint. Thereafter, a plug weld is added to the underside of the sweep in an offset or lifted portion of the bottom of the base sweep above the cutting plane of the sweep. The extra plug weld adds strength to the existing filet weld joint and significantly reduces the chance of inadvertent base sweep loss. The location of the plug weld above the cutting plane protects the plug weld from wear. The strap or step of the sweep assembly is slotted for ease of pitch adjustment, and the base sweep has wings with substantial fore-and-aft extending end portions to retain working width over the life of the sweep.

These and other objects, features and advantages of the present invention will become apparent from the drawings and the detailed description which follows.

DETAILED DESCRIPTION OF THE PREFERRED EMBODIMENT

Figure 1:
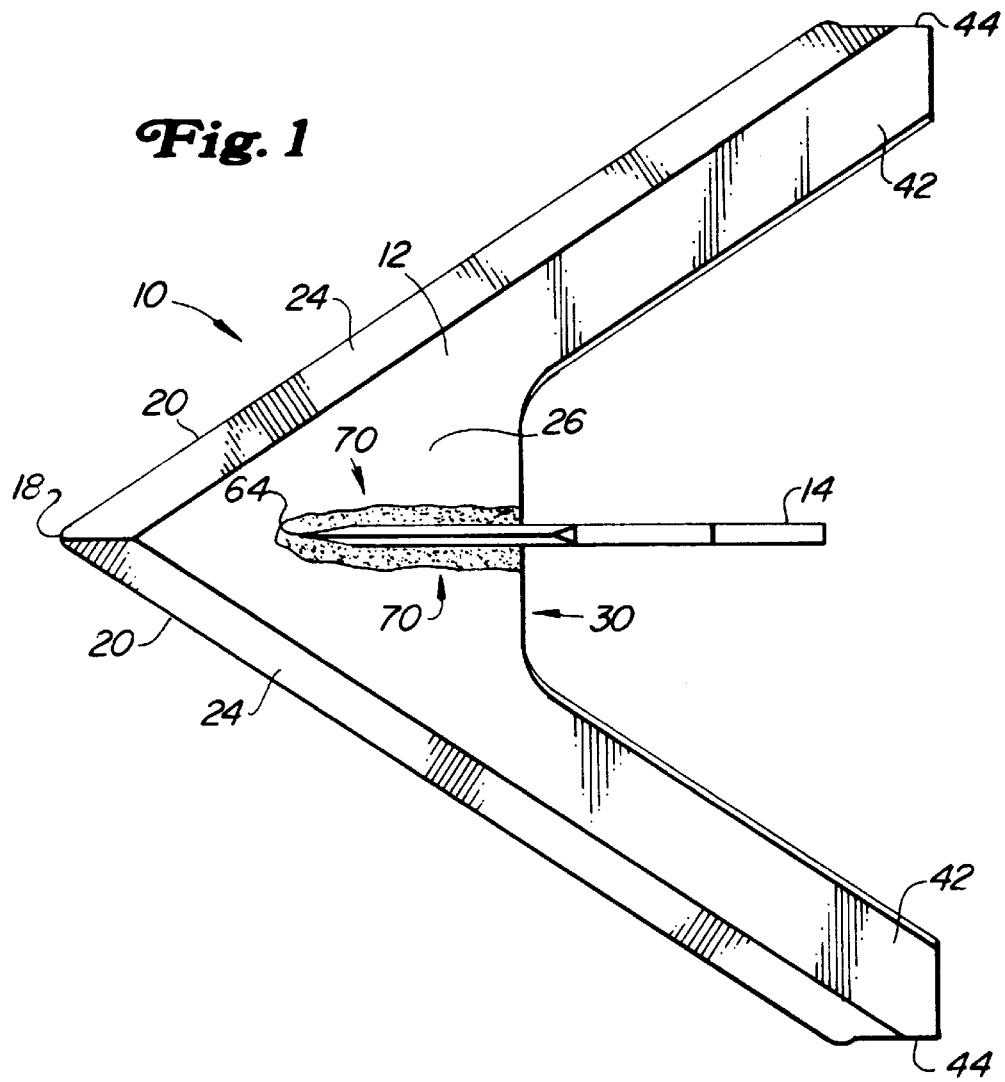
FIG. 1 is a top view of the sweep assembly of the present invention.
Figure 2:
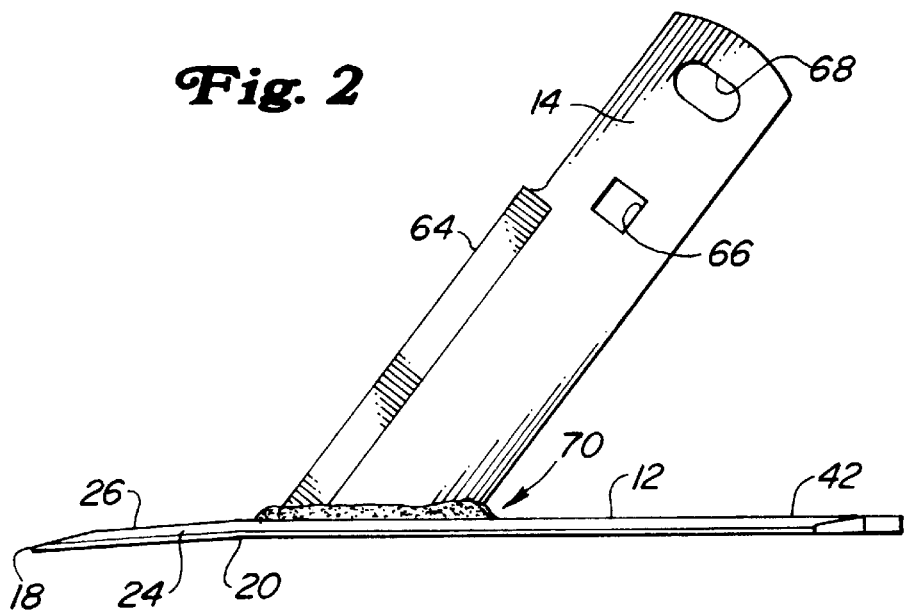
FIG. 2 is a side view of the sweep assembly of FIG. 1.

Referring to FIG. 1, a sweep assembly 10 which is of the Smith Fin type includes a base sweep 12 connected to a narrow upright strap or stem 14. The strap 14, in turn, is connected to a shank (not shown) on a cultivator rig or the like.

Figure 4:
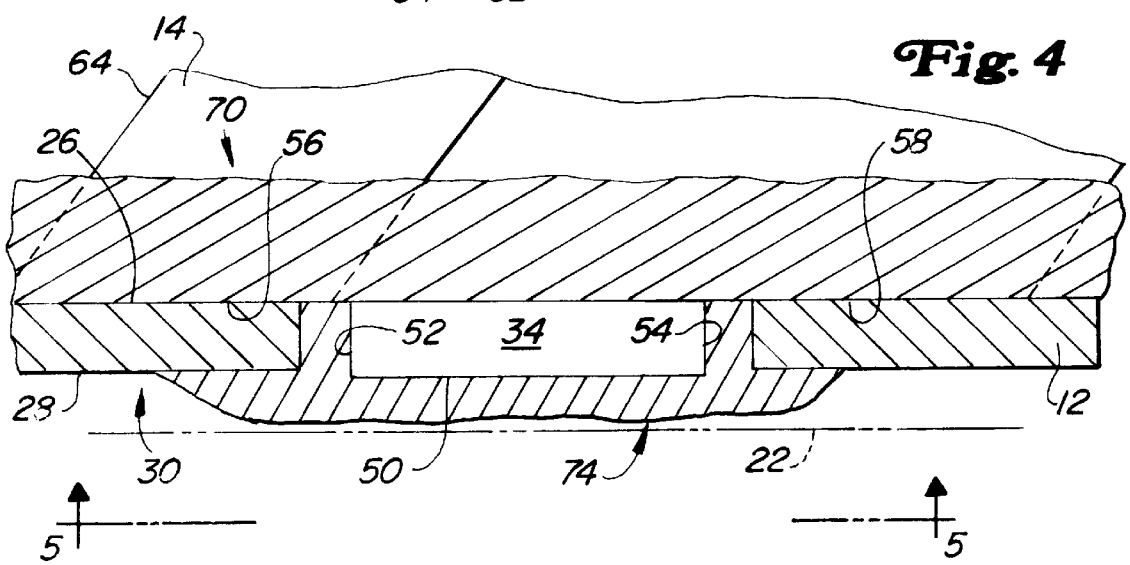
FIG. 4 is an enlarged side view partially in section of a portion of the area of the sweep assembly adjacent the tang, after the welds have been laid down in place.

The base sweep 12 is generally horizontally disposed and has a forwardly located central point 18. Leading cutting edges 20 diverge outwardly in the rearward direction from the point 18 and define a horizontal cutting plane shown generally at 22. The forward portion of the sweep 12 is bevelled as shown at 24 and extends upwardly from the cutting plane 22 to an upper sweep surface 26. A lower sweep surface 28 is coextensive with the surface 26 and defines an offset or raised portion, indicated at 30 in FIG. 4, above the cutting plane 22 near the central portion of the base sweep 12 where the strap 14 is attached.

The central portion of the sweep 12 is slotted in the fore-and-aft direction at 32, and the strap 14 includes a mating protrusion or tang 34 which extends into the slot 32. The central portion of the sweep 12 extends outwardly to rearwardly extending wings 42. The ends of the wings 42 include fore-and-aft extending outer edges 44 which help maintain the sweep width as the leading edges 20 wear.

The tang 34 on the strap 14 is fabricated to include a horizontal lower edge 50 and front and rear upright edges 52 and 54 connected to horizontally disposed lower strap surfaces 56 and 58, respectively. The tang 34 is inserted into the slot 32 so the surfaces 56 and 58 rest on the top of the central portion of the sweep adjacent the slot, and the strap is welded to the base sweep as described in detail below. The strap 14 extends upwardly and rearwardly at an acute angle to the cutting plane 22 and includes a lower knife edge portion 64 which is forged in the front of the strap. A mounting hole 66 and mounting slot 68 are located near the top of the strap 14 for connecting the sweep assembly 10 to a shank. The slot 68 facilitates sweep pitch adjustment on various shanks of differing geometry.

Figure 3:
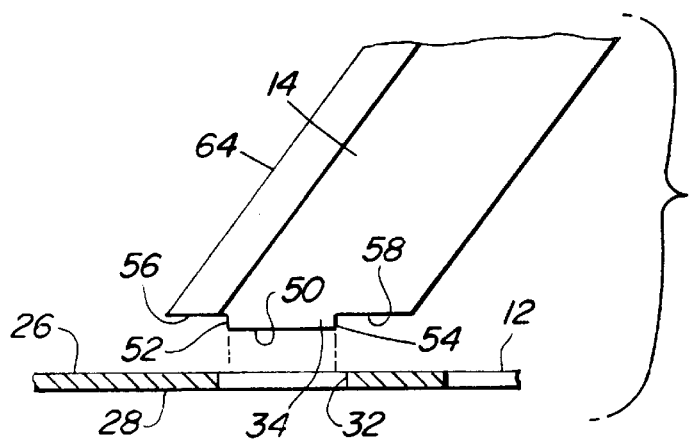
FIG. 3 is a side view, partially in section, showing the tang on the strap or stem about to be inserted into the slotted base sweep during fabrication of the sweep assembly of FIG. 1.
Figure 5:
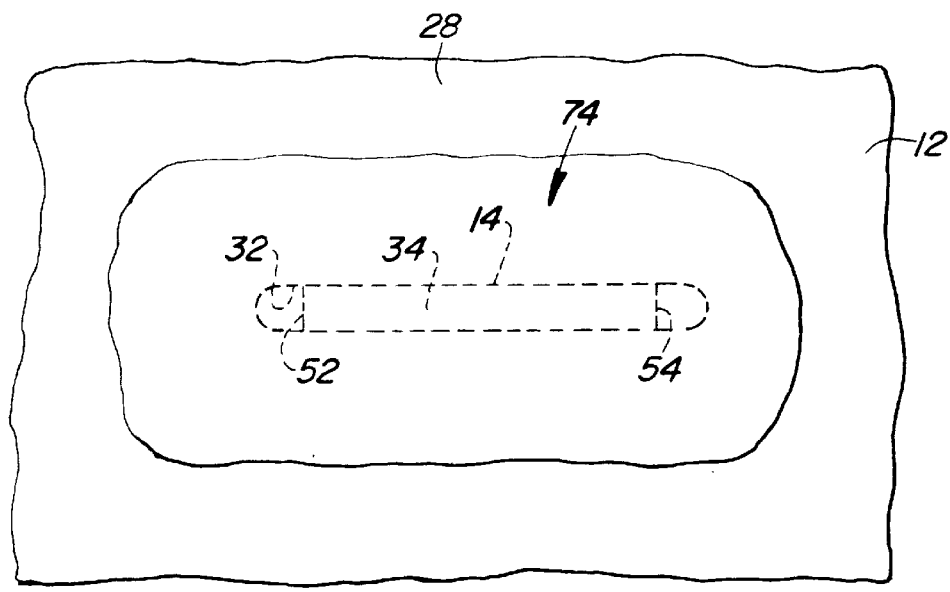
FIG. 5 is a bottom view, taken generally along lines 5—5 of FIG. 4, and showing the area of the weld and the location of the slot relative to the tang.

During assembly, the tang 34 of the strap 14 is positioned over the central portion of the sweep 12 (FIG. 3), and the tang 34 is inserted in the mating slot 32. Preferably the tang 34 has a loose fit in the slot 32 before the step of welding, although an interference fit can be provided to support the components and provide good initial metal to metal contact for the joint being formed. After the tang 34 is positioned in the slot 32, a filet weld joint 70 is formed at the sides of the strap 14. As shown in the figures, the weld joint 70 extends around the front and rear edges of the strap 14. After the filet weld joint 70 is formed, the sweep assembly is flipped over, and a plug weld 74 (FIGS. 4 and 5) is added to the underside of the sweep 12. The plug weld 74 is located within the raised portion 30 on the underside, above the cutting plane 22, for protection against wear.

Having described the preferred embodiment, it will become apparent that various modifications can be made without departing from the scope of the invention as defined in the accompanying claims.

We claim:

1. An agricultural sweep assembly comprising:

an upright and flat support strap having a leading edge, opposed sides, and a narrow lower end defining a rectangular insertion portion elongated in a fore-and-aft direction and having parallel planar sides terminating at a lowermost extremity;

a generally flat base sweep having top and bottom surfaces and a central base portion including a rectangular slot elongated in the fore-and-aft direction for mating with the rectangular planar insertion portion and receiving the insertion portion downwardly therein with the lowermost extremity projecting downwardly through the slot;

an upper weld fixing at least one of the planar sides to the top surface of the sweep; and a lower weld connecting the bottom surface of the sweep and the lowermost extremity of the insertion portion, thereby increasing sweep assembly strength and separation resistance of the base sweep relative to the strap.

2. The invention as set forth in claim 1 wherein the lower weld comprises a plug weld extending across the slot.

3. The invention as set forth in claim 1 wherein the base sweep includes leading edges defining a cutting plane, and wherein the bottom surface of the sweep is raised from the cutting plane adjacent the lower weld to thereby protect the lower weld from wear during operation in soil.

4. A method of fabricating a sweep assembly, comprising:

providing a base sweep having an upper surface, a lower surface, and a rectangularly slotted central portion defining a narrow elongated slot;

providing a sweep support portion having a lowermost portion with a narrow elongated tang with uninterrupted planar sides, the tang being rectangular in configuration and terminating in a lowermost edge conforming generally to the shape of the slotted central portion;

inserting the tang downwardly into the narrow elongated slot;

forming an upper weld joint by welding the sweep support portion to the upper surface of the base sweep; and forming a lower weld joint by welding the tang to the lower surface of the base sweep to thereby increase the strength of the upper and lower weld joints and reduce incidences of the base sweep falling from the sweep support portion if the upper weld joint should fail.

5. The method as set forth in claim 4 wherein the step of providing a base sweep includes providing a cutting edge defining a cutting plane, and raising the lower surface above the cutting plane adjacent the central portion, and wherein the step of forming the lower weld joint includes substantially maintaining the lower weld joint above the cutting plane to thereby reduce wear on the lower weld joint.

6. The method as set forth in claim 4 wherein the step of forming an upper weld joint includes forming a filet weld along the lowermost portion.

7. The method as set forth in claim 4 wherein the step of forming a lower weld joint comprises forming a plug weld at a lowermost edge of the tang.

8. The method as set forth in claim 4 wherein the step of forming the upper weld joint occurs prior to the step of forming the lower weld joint.

9. The method as set forth in claim 8 wherein the step of forming a lower weld joint comprises forming a plug weld filling an area around the tang and the slotted central portion.

10. The method as set forth in claim 4 wherein the step of providing a base sweep includes forming a fore-and-aft extending slot between the upper and lower surfaces, and wherein the step of inserting the tang includes projecting the tang substantially through the slot, and wherein the step of forming a lower weld joint includes filling an area around the slot and the tang with a weld.

11. The method as set forth in claim 10 wherein the step of filling the area around the slot includes protecting the filled area against wear by maintaining the weld in the filled area above a lowermost extremity of the lower surface of the sweep.

* * * * *